US008529851B2

(12) United States Patent
Torrecillas San Millán et al.

(10) Patent No.: US 8,529,851 B2
(45) Date of Patent: Sep. 10, 2013

(54) LITHIUM ALUMINOSILICATE-BASED MATERIALS WITH NEGATIVE THERMAL EXPANSION COEFFICIENT IN A BROAD TEMPERATURE RANGE PREPARATION PROCESS AND USE

(75) Inventors: Ramón Torrecillas San Millán, Oviedo (ES); Adolfo Fernández Valdés, Oviedo (ES); Olga García Moreno, Oviedo (ES)

(73) Assignee: Consejo Superior de Investigaciones Científicas (CSIC) (ES)

( * ) Notice: Subject to any disclaimer, the term of this patent is extended or adjusted under 35 U.S.C. 154(b) by 50 days.

(21) Appl. No.: 13/139,284

(22) PCT Filed: Nov. 27, 2009

(86) PCT No.: PCT/ES2009/070534
§ 371 (c)(1),
(2), (4) Date: Aug. 24, 2011

(87) PCT Pub. No.: WO2010/066929
PCT Pub. Date: Jun. 17, 2010

(65) Prior Publication Data
US 2011/0301016 A1 Dec. 8, 2011

(30) Foreign Application Priority Data
Dec. 12, 2008 (ES) .................... 200803530

(51) Int. Cl.
*C04B 35/00* (2006.01)
(52) U.S. Cl.
USPC ............... 423/118.1; 423/328.1; 501/153
(58) Field of Classification Search
USPC ............ 423/118.1, 328.1; 264/618, 667; 241/23; 501/153
See application file for complete search history.

(56) References Cited

U.S. PATENT DOCUMENTS
| | | | |
|---|---|---|---|
| 5,320,792 A | 6/1994 | Wu | |
| 6,066,585 A | 5/2000 | Swartz et al. | |
| 6,566,290 B2 * | 5/2003 | Beall et al. | 501/128 |
| 2004/0112503 A1 | 6/2004 | Chen et al. | |

FOREIGN PATENT DOCUMENTS
| | | |
|---|---|---|
| WO | WO 0228803 A1 | 4/2002 |
| WO | WO 2011/023842 A2 | 3/2011 |
| WO | WO 2011/073483 A1 | 6/2011 |
| WO | WO 2011/083193 A1 | 7/2011 |

OTHER PUBLICATIONS

O. Garcia-Moreno et al., "Alumina reinforced eucryptite ceramics: Very low thermal expansion material with improved mechanical properties," Journal of the European Ceramic Society 31 (2011) 1641-1648.
O. Garcia-Moreno et al., "Conventional sintering of LAS-SiC nanocomposites with very low thermal expansion coefficient," Journal of the European Ceramic Society 30 (2010) 3219-3225.
O. V. Kichkailo and I. A. Levitskii, "Science for ceramic production," Glass and Ceramics vol. 62, Nos. 5-6, 2005, Translated from Steklo i Keramika, No. 6, pp. 26-31, Jun. 2005.
G. N. Maslennikova et al., "Synthesis and properties of eucryptite-mullitic materials," S. Ordzhonikidze Moscow MIU. All-Union Scientific-Research Institute for Electrical Ceramics. Translated from Steklo i Keramika~ No. 8, pp. 22-24, Aug. 1983.
O. Garcia-Moreno et al., "Negative thermal expansion of lithium aluminosilicate ceramics at cryogenic temperatures," Scripta Materialia 63 (2010) 170-173.
R. Roy, "Synthesizing new materials to specification," Solid State Ionics 32/33 (1989) 3-22.
O. Garcia-Moreno, "Solid state sintering of very low and negative thermal expansion ceramics by Spark Plasma Sintering," Ceramics International 37 (2011) 1079-1083.
H. Bach and a Krause, eds. Low Thermal Expansion Glass Ceramics. 2nd. ed. Germany: Springer, 2005. Print Schott Series on Glass and Glass Ceramics Science, Technology, and Applications.
Written Opinion of the International Searching Authority, issued in International application No. PCT/ES2009/070534, mailed Mar. 10, 2010.
International Search Report, issued in International application No. PCT/ES2009/070534, mailed Mar. 10, 2010.
International Preliminary Report on Patentability, issued in International application No. PCT/ ES20091070534, report issued on Jun. 14, 2011.

* cited by examiner

*Primary Examiner* — Steven Bos
(74) *Attorney, Agent, or Firm* — Byrne Poh LLP; Nina R. Horan

(57) ABSTRACT

New process for obtaining lithium aluminosilicate-based (LAS) ceramic materials having a near-zero and negative thermal expansion coefficient within a temperature range of (−150° C. to 450° C.). These materials are applicable to the manufacture of components that require a high level of dimensional stability.

22 Claims, 3 Drawing Sheets

LITHIUM ALUMINOSILICATE-BASED MATERIALS WITH NEGATIVE THERMAL EXPANSION COEFFICIENT IN A BROAD TEMPERATURE RANGE PREPARATION PROCESS AND USE

CROSS-REFERENCE TO RELATED APPLICATION

This application is a national stage application under 35 U.S.C. §371 of International Application No. PCT/ES2009/070534, filed Nov. 27, 2009 which claims priority to Spanish Patent Application No. P200803530, filed Dec. 12, 2008, both of which are hereby incorporated by reference in their entireties.

FIELD OF THE ART

The present invention relates to ceramics having a negative and/or near-zero thermal expansion coefficient, which can be used in the manufacture of components that require a high level of dimensional stability. Therefore, the technology described in the invention falls within the new materials sector, while its application falls within the microelectronics, precision optics and aeronautical sectors.

STATE OF THE ART

Materials with a low thermal expansion coefficient are those wherein the volume variations associated to temperature changes are very small. Temperature-driven changes in the volume of materials is normally evaluated using the thermal expansion coefficient (TEC), which is defined as the variation in volume of a material with increasing temperature and must always refer to the temperature range wherein said variation was observed.

In ceramic materials, composed of a multitude of randomly oriented crystals, volume variation is usually extrapolated to linear variation. This is referred to as changes in elongation driven by temperature changes. These changes in elongation with regard to initial length driven by an increase in temperature are defined as linear thermal expansion coefficient. In general and herein, reference is made to the thermal expansion coefficient or TEC, referring to the aforementioned linear variation. When elongation value with increasing temperature is positive, we refer to positive TEC materials, while if this variation is negative we refer to negative TEC materials. Materials with a low TEC are materials wherein this variation in elongation is very close to zero. These materials therefore have a high level of dimensional stability upon temperature change, due to which they are of great interest for a wide range of applications in very diverse fields. These types of materials are, for example, required in many types of high-precision devices and instrumentation equipment in high technology systems, and in the microelectronics and precision optics industry. In all those applications wherein the dimensional stability of a precision element upon temperature change must be ensured, it will be necessary to lower the TEC of the constituent materials of those elements. The problem of the alteration in thermal expansion in elements manufactured using different materials can also be solved by means of the design of composites with a required (and homogeneous) TEC. The design of these materials with a "customised" TEC can be addressed using a combination of components with positive and negative expansion. This customised TEC design of the composites can be carried out for different temperatures, in such a manner that the final field of application of components having zero TEC will depend on whether they also achieve the rest of the specific functionality characteristics required by this application. The lithium aluminosilicate (LAS) family of ceramics and vitroceramics is frequently used for this purpose in many fields of application, from vitroceramics for kitchens to mirrors for satellites. Some mineral phases of this family have a negative TEC, which allows their use in composites with a controlled and customised TEC. Materials with a negative TEC often have low fracture resistance, as their negativity is due to a strong anisotropy between the different crystallographic orientations, wherein one of these usually exhibits negative behaviour and the other two positive behaviour. This anisotropy usually causes micro-fissures, resulting in low values in the mechanical properties of these materials. In any case, the use of these expansion properties for manufacturing composites with zero TEC has a broad range of potential applications in engineering, photonics and electronics and in other specific structural applications [R. Roy et al., Annual Review of Materials Science, 19, 59-81 (1989)].

The LAS phase with negative expansion coefficient is β-eucryptite ($LiAlSiO_4$), while spodumene ($LiAlSi_2O_6$) has practically zero expansion.

The traditional LAS ceramic manufacturing method is based on the formation of glasses to produce vitroceramics. This method comprises the manufacture of molten material which is subsequently shaped and subjected to thermal treatment for partial crystallisation thereof [H. Bach, Low Thermal Expansion Glass Ceramics, Springer-Verlag, Berlin, 1995].

The ceramic products thus obtained are frequently heterogeneous. On other occasions, ceramic materials are required in the absence of or with a very low proportion of the vitreous phase, which reduces the rigidity and resistance of the ceramic products. Therefore, a method for manufacturing solid-state LAS ceramics is required which, in addition to being inexpensive, is easy to accurately adapt the final composition of the material and consequently its TEC.

Sol-gel processing methods have been applied in the manufacture of LAS ceramics [W. Nan-Chung, Y. Sheng, U.S. Pat. No. 5,320,792 dated 14, Jun. 2004] due to its multiple advantages and low processing temperatures. However, these methods are tedious, expensive and difficult to apply in industrial processes that require large amounts of material.

Other methods for obtaining solid-state LAS ceramics use lithium carbonate, aluminium oxide and silicon oxide as raw materials [C. Jyh-Chen, S. Gwo-Jiun, US2004112503 dated 17, Jun. 2004]. In this paper, reference is made to calcination for obtaining a precursor and to a thermal treatment applied subsequent to sintering. These authors highlight the difficulty of sintering these ceramics.

[S. L. Swartz, U.S. Pat. No. 6,066,585 dated 23, May 2000] also makes reference to calcination for obtaining a precursor, although in this case they use an excess of lithium oxide, in comparison to the stechiometric composition of β-eucryptite ($LiAlSiO_4$), aimed at lowering sintering temperatures and increasing mechanical resistance. This procedure causes the formation of second phases and consequently modifies the TEC values compared to monolithic β-eucryptite ceramics. In order to obtain better micro-structures and higher quality in LAS ceramics with controlled TEC values, a method including the aforementioned advantages of the sol-gel method and having industrial scalding process capacity must be developed.

The method developed herein differs from other previously published methods [G. Maslennikova, Inorganic materials, 20, 9, 1984] and [A. Yamuna, et al., Journal of the American Ceramic Society, 84, 8, 2001] wherein β-eucryptite synthesis is based on the use of lithium carbonate raw materials and kaolin, as well as silica and alumina precursors such as silica sand and commercial alumina, wherein, in addition to the modification of the structure of kaolin by addition to lithium carbonate, the necessary silica and alumina for adjusting the stechiometry of the β-eucryptite being formed, is added in the form of a precursor solution, which leads to the formation of the β-eucryptite synthesis phase at much lower temperatures, with better control over the resulting phases. In this manner, an effect similar to that achieved by means of sol-gel methods is achieved, with the advantage over said sol-gel methods of being a simple, inexpensive and totally scalable process at industrial level.

DESCRIPTION OF THE INVENTION

The present invention is based on a new process for obtaining lithium aluminosilicate-based (LAS) ceramic materials having a near-zero and negative thermal expansion coefficient within the temperature range (−150° C. to 450° C.) which comprises a preparation stage of the lithium aluminosilicate (LAS) as of kaolin, $Li_2CO_3$ and a $SiO_2$ or $Al_2O_3$ precursor solution. Although a process for preparing these materials has been published wherein kaolin and $LiCO_3$ are used in a powder mixture for preparing the LAS precursor [O. V. Kichkailo and I. A. Levitskii, Glass and Ceramics, 62, 5-6, 2005] and [A. Yamuna, et al., Journal of the American Ceramic Society, 84, 8, 2001], a process that uses a $SiO_2$ or $Al_2O_3$ precursor solution in this stage of the preparation had never been published. The use of this $SiO_2$ or $Al_2O_3$ precursor solution represents a novel aspect and a significant technical advantage with respect to other methods mentioned in the literature, as it is essential for obtaining β-eucryptite at a low temperature with control of the pure phases and, consequently, with a more accurately adjusted TEC.

Therefore, one aspect of the present invention is the process for preparing lithium aluminosilicate-based ceramic materials having a near-zero and negative thermal expansion coefficient within the temperature range −150° C. to 450° C., which comprises a stage for preparing the lithium aluminosilicate precursor as of kaolin, $Li_2CO_3$ and a $SiO_2$ or $Al_2O_3$ precursor solution.

A preferred aspect of the present invention is the process for obtaining ceramic materials, hereinafter referred to as the process for preparing ceramic materials of the invention, characterised in that it comprises the following stages:
a. synthesis of the lithium aluminosilicate precursor by means of the preparation of a kaolin suspension, $Li_2CO_3$ and a $SiO_2$ or $Al_2O_3$ precursor solution,
b. calcination of the resulting powder after drying the mixture obtained in a),
c. milling and drying of the material obtained in b),
d. shaping of the material obtained in c),
e. sintering of the material obtained in d).

A more preferred aspect of the present invention is the process for preparing ceramic materials of the invention wherein tetraethyl orthosilicate is used as a $SiO_2$ precursor.

Another more preferred aspect of the present invention is the process for preparing ceramic materials of the invention wherein aluminium ethoxide as an alumina precursor.

Another more preferred aspect of the present invention is the process for preparing ceramic materials of the invention wherein the suspension of stage a) is an alcohol.

Another more preferred aspect of the present invention is the process for preparing ceramic materials of the invention wherein the calcination of stage b) is carried out at a temperature comprised between 400° C. and 970° C. for a period comprised between 1 and 240 hours.

Calcinations at a temperature of 900° C. transform the structure of kaolin, directly giving a β-eucryptite-type structure. Lower temperatures can be used, but using longer calcination times. The transformation of the structure of α into β in the eucryptite normally takes place at 970° C., due to which the calcination temperature must be greater than or equal to 970° C. in order to obtain a LAS precursor having a single β-eucryptite-type structural phase. In this process lower calcination temperatures have been achieved, obtaining the β phase as a result.

A particular embodiment of the present invention is the process for preparing ceramic materials of the invention wherein the calcination of stage b) is carried out at a temperature of 900° C. for a period of 2 hours.

Another more preferred aspect of the present invention is the process for preparing ceramic materials of the invention wherein the calcination of stage b) is carried out after sifting the solid obtained on drying the suspension obtained in a).

Another more preferred aspect of the invention is the process for preparing ceramic materials of the invention wherein the milling of stage c) is carried out by attrition in a high-energy mill.

By means of the high-energy attrition mill, a β-eucryptite powder with a very fine grain size is obtained. This very fine grain size is essential to subsequently obtaining ceramic LAS bodies having a high relative density with enhanced mechanical properties.

Another particular embodiment of the present invention is the process for preparing ceramic materials of the invention wherein attrition in the high-energy mill is carried out operating at 100-400 r.p.m, preferably 350 r.p.m., for periods of more than 20 minutes.

Another more preferred aspect of the present invention is the process for preparing ceramic materials of the invention wherein the drying of stage c) is carried out by means of atomisation.

Another more preferred aspect of the present invention is the process for preparing ceramic materials of the invention wherein the shaping of the material of stage d) is carried out by means of isostatic pressing.

Another particular embodiment of the present invention is the process for preparing ceramic materials of the invention wherein the shaping of the material of stage d) is carried out by means of cold isostatic pressing and at pressures of between 100 and 400 MPa, preferably 200 MPa.

Another more preferred aspect of the present invention is the process for preparing ceramic materials of the invention wherein the sintering of stage e) is carried out at a temperature of between 900° C. and 1,500° C.

Another particular embodiment of the present invention is the process for preparing ceramic materials wherein the sintering of stage e) is carried out at a temperature of 1,350° C.

A particular example of the present invention is the process for preparing ceramic materials of the invention wherein a temperature ramp of 2-10° C./min, preferably 5° C./min, is used, maintaining the final temperature for a period comprised between 1 and 4 hours, and a subsequent cooling of up to 900° C. using a temperature ramp of 2-10° C./min, preferably 5° C./min.

Another more preferred aspect of the present invention is the process for preparing ceramic materials of the invention wherein stages d) and e) are carried out using the hot-press technique.

The hot-press technique is based on the simultaneous application of pressure and high temperature to accelerate densification speed. In this technique, heating takes place by means of graphite resistors.

Another particular embodiment of the present invention is the process for preparing ceramic materials of the invention wherein stages d) and e) are carried out using the hot-press technique at a temperature comprised within the range of 900-1,400° C., preferably 1,100° C.

Another particular embodiment of the present invention is the process for preparing ceramic materials of the invention wherein stages d) and e) are carried out using the hot-press technique at a pressure of 5 and 80 MPa, preferably 15 MPa.

Another more preferred aspect of the present invention is the process for preparing ceramic materials of the invention wherein stages d) and e) are carried out using the spark plasma sintering (SPS) technique.

The spark plasma sintering technique is also based on the simultaneous application of pressure and high temperature. As opposed to hot-pressing, this technique is based on the application of spark discharges through the graphite moulds and the sample, allowing the use of heating speeds in the order of hundreds of degrees per minute.

Another particular embodiment of the present invention is the process for preparing ceramic materials of the invention wherein stages d) and e) are carried out using the spark plasma sintering (SPS) technique at a temperature comprised between 900° C. and 1,400° C., preferably 1,100° C.

Another particular embodiment of the present invention is the process for preparing ceramic materials of the invention wherein stages d) and e) are carried out using the spark plasma sintering (SPS) technique, for a period of more than 1 minute, preferably 5 minutes.

Another particular embodiment of the present invention is the process for preparing ceramic materials of the invention wherein stages d) and e) are carried out using the spark plasma sintering (SPS) technique at a pressure comprised between 5 and 80 MPa, preferably 50 MPa.

Another aspect of the present invention is the ceramic material prepared using any of the previously described processes.

The ceramic materials of the present invention have negative and/or near-zero TEC values for a broad temperature range (between $-150°$ C. and $450°$ C.). The mechanical properties of the materials prepared by means of this invention are better than those of materials with negative TEC values available to date, which have values of approximately 35 MPa and E values of approximately 36 GPa [S. L. Swartz, U.S. Pat. No. 6,066,585 dated 23, May 2000].

Another preferred aspect of the present invention is the lithium aluminosilicate-based ceramic material prepared using the process for preparing ceramic materials of the invention, wherein its final density is 98% higher than the theoretical density and its thermal expansion coefficient is $<0.5 \times 10^{-6}$ K$^{-1}$ within the temperature range $-150°$ C. to $450°$ C.

The composition of the LAS ceramic materials of the present invention lies between spodumene and eucryptite, i.e. $Li_2O:Al_2O_3:SiO_2$ between 1:1:4 and 1:1:2. The main phase in the sintered material is a β-eucryptite solid solution which is stable at relatively high temperatures.

Another aspect of the present invention is the use of ceramic material, prepared using any of the previously described processes, in the manufacture of new materials.

Another preferred aspect of the present invention is the use of the ceramic material, prepared by means of any of the previously described processes, in the manufacture of components that require a high level of dimensional stability, such as for example high-precision measuring instruments, mirrors for space observation systems, whether terrestrial or aerial, optical lithography scanners, holography, laser instruments or heat dissipators.

EXAMPLES OF EMBODIMENT

Figure 1:
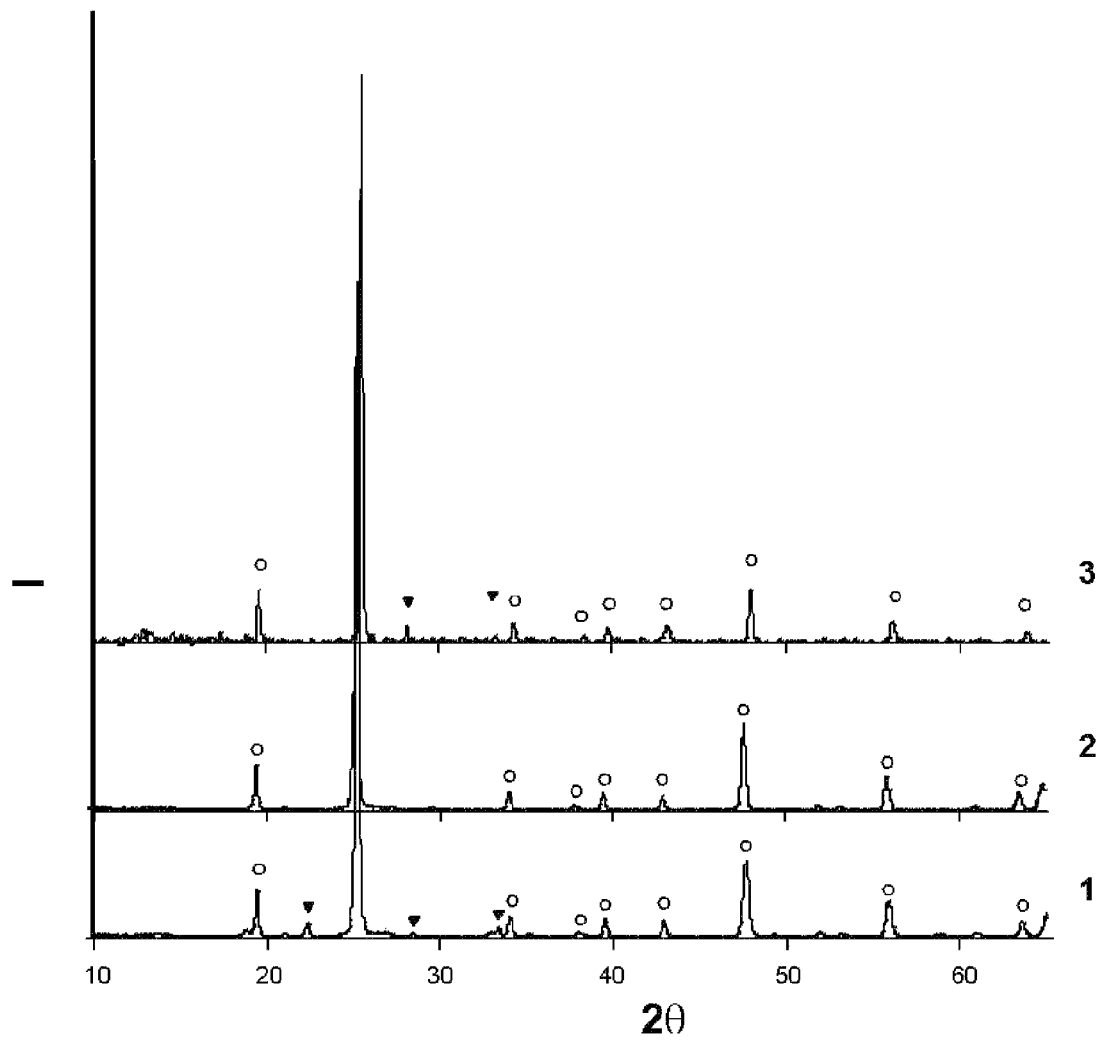
FIG. 1 shows X-ray diffractogrammes corresponding to the LAS materials obtained in examples 1, 2 and 3. The β-eucryptite solid solution is indicated by the peaks circled in white. The peaks corresponding to lithium aluminosilicate (examples 1 and 3) are indicated by black triangles.
Figure 2:
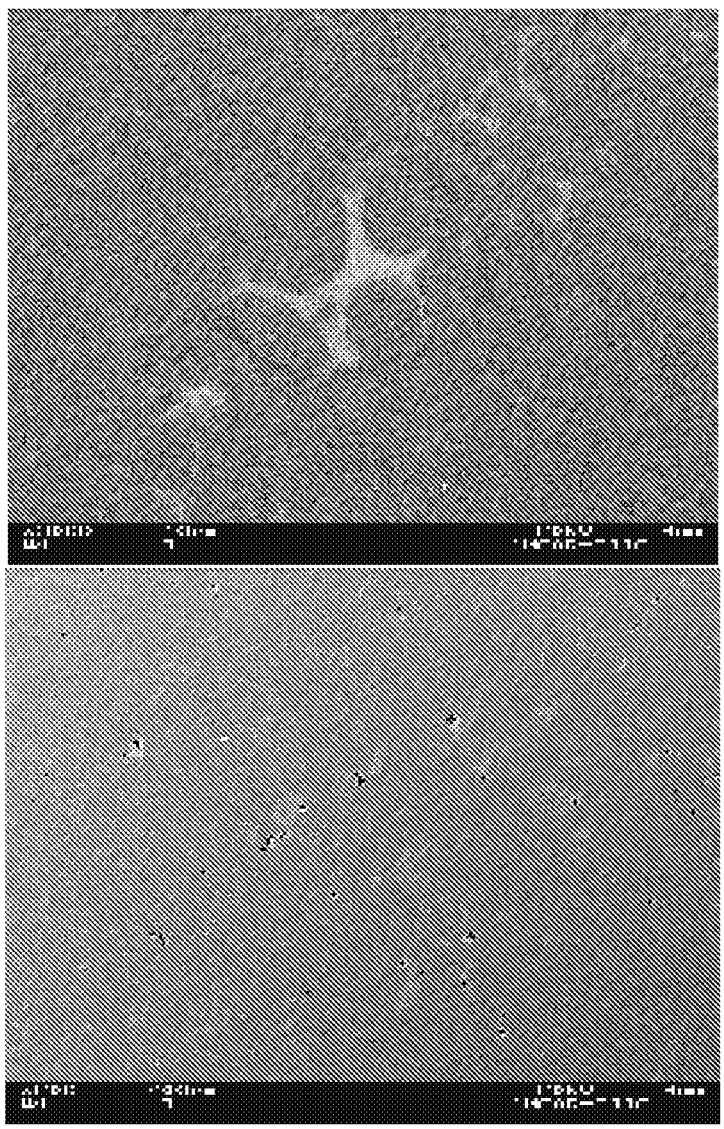
FIG. 2 shows photographs of the materials obtained in example 2 obtained using a scanning electron microscope, wherein the formation of a small percentage of vitreous phase (lighter grey) and scarce porosity can be observed.
Figure 3:
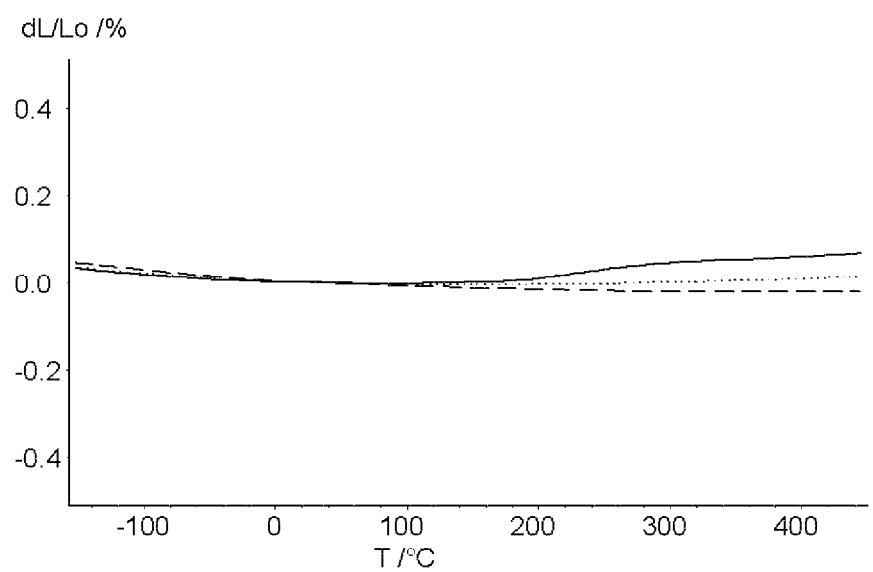
FIG. 3 shows dilatometries corresponding to the materials prepared in the different examples: example 1: dashed line; example 2: continuous line; example 3: dotted line.

A series of trials conducted by the inventors, which are representative of the effectiveness of the process of the invention for obtaining a LAS material having a negative or near-zero thermal expansion coefficient in the temperature range of $-150°$ C. to $450°$ C., are described below. These examples are shown in FIGS. 1 to 3.

The method comprises the synthesis of a ceramic powder by means of calcination treatments prior to a high-energy milling stage essential to obtaining an improved microstructure of the final dense ceramic material.

Example 1

Synthesis of a LAS Precursor Having Greater SiO2 Content than that of the Starting Kaolin and Subsequent Densification Thereof by Means of Sintering in a Conventional Oven The synthesis of ceramic powder starts by preparing the starting materials. This implies the use of kaolin, in this example "Arcano" kaolin from Moltuval (Spain), with a composition of $Al_2O_3.2.37SiO_2.2.67H_2O$; lithium carbonate RECTAPUR (99%, VWR Prolabo) and tetraethyl orthosilicate (TEOS) (99.5%, Sigma-Aldrich). The appropriate quantities of kaolin (528.7 g) are dispersed in 2 litres of ethanol. This dispersion is mechanically agitated at ambient temperature. The appropriate quantity of lithium carbonate (131.9 g) is then added to the dispersion, continuing agitation. Finally, the TEOS (339.4 g) is slowly added while gradually continuing agitation thereof. After mixing the raw materials, agitation is continued for 1 hour. The suspension thus obtained is dried by evaporation of the solvent, raising the temperature to 80° C. while continuing agitation. When practically all of the solvent has evaporated, the nearly dry suspension is introduced in an oven at 120° C. in order to complete drying thereof.

The dry mixture is sifted prior to the calcination treatment in order to reach graining below 63 μm using a 63 μm sieve.

Next, the calcination process is carried out for the formation of the LAS precursor, to which end the powder is placed in alumina crucibles which are introduced in an oven. The calcination treatment was carried out at 900° C. for 2 hours with a temperature ramp of 5° C./min.

After calcination, the starting powder is transformed into the LAS precursor. This precursor is a β-eucryptite solid solution, the composition of which is verified by means of X-ray diffraction.

The next step consists of attrition of the precursor in a high-energy mill. To this end, a stable precursor suspension is prepared and introduced in the mill, dispersing the precursor powder in ethanol (40% of solid content) by mechanical agitation for 60 minutes. The attrition mill, with a 9/1 content of alumina balls, operated at 350 r.p.m. for 60 minutes. The precursor has a sub-micrometric size after milling. The suspension thus obtained is dried by atomisation at the same time that the solvent is recovered.

The dry precursor is shaped by means of cold isostatic pressing at 200 MPa.

This shaped material is sintered in an oven at 1,350° C. for 2 hours with a temperature ramp of 5° C./min. Cooling is controlled up to 900° C. at the same speed.

Characterisation has been carried out by means of X-ray diffraction for the purpose of controlling the resulting association of phases in the sintered material. The diffractogramme corresponding to the material obtained according to this example of embodiment is shown in FIG. 1. In this example, the ceramic body consists mainly of a β-eucryptite solid solution. Small traces of $LiAlO_2$ have been detected. Small traces of vitreous phase (<2 vol %) have also been detected in the images of retro-dispersed electrons obtained by scanning electron microscopy, a detailed view of which is shown in FIG. 2. This small percentage of glass aids sintering without affecting the mechanical properties.

The sintered sample has been characterised using a Netszch DIL402C dilatometer to obtain the TEC value. The corresponding curve is shown in FIG. 3. The Young module was determined by means of the resonance frequency method, using a Grindosonic apparatus. Its fracture resistance was determined by conducting a four-point bend test using INSTRON 8562 testing equipment. The results of these properties are shown in Table I.

Example 2

Synthesis of a LAS Precursor Having a Higher Al2O3 Content than that of the Starting Kaolin and Subsequent Densification Thereof by Means of Spark Plasma Sintering The synthesis of ceramic powder starts by preparing the starting materials. This implies the use of kaolin, in this example "Arcano" kaolin from Moltuval (Spain), with a composition of $Al_2O_3.2.37SiO_2.2.67H_2O$; lithium carbonate RECTAPUR (99%, VWR Prolabo) and aluminium ethoxide (>97%, Sigma-Aldrich). The appropriate quantities of kaolin (550.3 g) are dispersed in 2 litres of ethanol. This dispersion is mechanically agitated at ambient temperature. The appropriate quantity of lithium carbonate (164.7 g) is then added to the dispersion, continuing agitation thereof. Finally, the aluminium ethoxide (111.3 g) is slowly added while gradually continuing agitation. After mixing the raw materials, agitation is continued for 1 hour. The suspension thus obtained is dried by evaporation of the solvent, raising the temperature to 80° C. while continuing agitation. When practically all of the solvent has evaporated, the nearly dry suspension is introduced in an oven at 120° C. in order to complete drying thereof.

The dry mixture is sifted prior to the calcination treatment in order to reach graining below 63 μm using a 63 μm sieve.

Next, the calcination process is carried out for the formation of the LAS precursor. The powder is placed in alumina crucibles which are introduced in an oven. The calcination treatment was carried out at 900° C. for 2 hours with a temperature ramp of 5° C./min.

After calcination, the starting powder is transformed into the LAS precursor. This precursor is a β-eucryptite solid solution, the composition of which is verified by means of X-ray diffraction.

The next step consists of attrition of the precursor in a high-energy mill. To this end, a stable precursor suspension was prepared and introduced in the mill, dispersing the precursor powder in ethanol (40% of solid content) by mechanical agitation for 60 minutes. The attrition mill, with a 9/1 content of alumina balls, operated at 350 r.p.m. for 60 minutes. The precursor has a sub-micrometric size after milling. The suspension thus obtained is dried by atomisation at the same time that the solvent is recovered.

The dry precursor is introduced in a graphite mould and subjected to an initial uniaxial pressure of 5 MPa. Next, the material is sintered using the SPS technique with the following experimental variables: heating speed of 25° C./min, maximum temperature of 1,150° C., maximum pressure of 50 MPa, permanence time of 5 minutes at maximum temperature and pressure.

Characterisation has been carried out by means of X-ray diffraction for the purpose of controlling the resulting association of phases in the sintered material. The diffractogramme corresponding to the material obtained according to this example of embodiment is shown in FIG. 1. In this example, the ceramic body consists mainly of a β-eucryptite solid solution. As in the preceding example, small traces of the vitreous phase were also detected.

The sintered sample has been characterised using a Netszch DIL402C dilatometer to obtain the TEC value. The corresponding curve is shown in FIG. 3. The Young module was determined by means of the resonance frequency method, using a Grindosonic apparatus. Its fracture resistance was determined by conducting a four-point bend test using INSTRON 8562 testing equipment. The results of these properties are shown in Table I.

Example 3

Synthesis of a LAS Precursor Having a Higher SiO2 Content than that of the Starting Kaolin and Subsequent Densification Thereof by Means of Hot-Pressing The synthesis of ceramic powder starts by preparing the starting materials. This implies the use of kaolin, in this example "Arcano" kaolin from Moltuval (Spain), with a composition of $Al_2O_3.2.37SiO_2.2.67H_2O$; lithium carbonate RECTAPUR (99%, VWR Prolabo) and tetraethyl orthosilicate (99.5%, Sigma-Aldrich). The appropriate quantities of kaolin (528.7 g) are dispersed in 2 litres of ethanol. This dispersion is mechanically agitated at ambient temperature. The appropriate quantity of lithium carbonate (131.9 g) is then added to the dispersion, continuing agitation. Finally, the TEOS (339.4 g) is slowly added while gradually continuing agitation thereof. After mixing the raw materials, agitation is continued for 1 hour. The suspension thus obtained is dried by evaporation of the solvent, raising the temperature to 80° C. while continuing agitation. When practically all of the solvent has evaporated, the nearly dry suspension is introduced in an oven at 120° C. in order to complete drying thereof.

The dry mixture is sifted prior to the calcination treatment to reach graining below 63 µm using a 63 µm sieve.

Next, the calcination process is carried out for the formation of the LAS precursor. The powder is placed in alumina crucibles which are introduced in an oven. The calcination treatment was carried out at 900° C. for 2 hours with a temperature ramp of 5° C./min.

After calcination, the starting powder is transformed into the LAS precursor. This precursor is a β-eucryptite solid solution, the composition of which is verified by means of X-ray diffraction.

The next step consists of attrition of the precursor in a high-energy mill. A stable precursor suspension was prepared and introduced in the mill, dispersing the precursor powder in ethanol (40% of solid content) by mechanical agitation for 60 minutes. The attrition mill, with a 9/1 content of alumina balls, operated at 350 r.p.m. for 60 minutes. The precursor has a sub-micrometric size after milling. The suspension thus obtained is dried by atomisation at the same time that the solvent is recovered.

The dry precursor is introduced in a graphite mould and subjected to an initial uniaxial pressure of 5 MPa. Next, the material is sintered by means of hot-pressing with the following experimental variables: heating speed of 5° C./min, maximum temperature of 1,150° C., maximum pressure of 15 MPa, permanence time of 1 hour at maximum temperature and pressure.

Characterisation has been carried out by means of X-ray diffraction for the purpose of controlling the resulting association of phases in the sintered material. The diffractogramme corresponding to the material obtained according to this example of embodiment is shown in FIG. 1. In this example, the ceramic body consists mainly of a β-eucryptite solid solution. As in the preceding examples, small traces of LiAlO2 and vitreous phase were also detected.

The sintered sample has been characterised using a Netszch DIL402C dilatometer to obtain the TEC value. The corresponding curve is shown in FIG. 3. The Young module was determined using the resonance frequency method, using a Grindosonic apparatus. Its fracture resistance was determined by conducting a four-point bend test using INSTRON 8562 testing equipment. The results of these properties are shown in Table I.

TABLE I

| Property | Example 1 | Example 2 | Example 3 |
|---|---|---|---|
| Density % | 95.6 | 99.3 | 98.5 |
| Yound Mod. (GPa) | 35 | 107 | 96 |
| Resistance (MPa) | 37 | 110 | 99 |
| TEC between −150° C. and 450° C. (1/K * 10 − 6) | −1.13 | 0.45 | −0.33 |

The invention claimed is:

1. A process for preparing lithium aluminosilicate-based ceramic materials with a near-zero and negative thermal expansion coefficient within the temperature range of 150° C. to 450° C., comprising the steps of:
   a. preparing a lithium aluminosilicate precursor comprising a kaolin suspension, $Li_2CO_3$ and a precursor solution of $SiO_2$ or $Al_2O_3$ and drying said lithium aluminosilicate precursor to form a powder,
   b. calcining the powder obtained in step a),
   c. milling and drying the powder obtained in step b),
   d. shaping the powder obtained in step c) to form a shaped material, and
   e. sintering the shaped material obtained in step d).

2. The process for preparing ceramic materials, according to claim 1, wherein tetraethyl orthosilicate is the $SiO_2$ precursor.

3. The process for preparing ceramic materials, according to claim 1, wherein aluminium ethoxide is the $Al_2O_3$ precursor.

4. The process for preparing ceramic materials, according to claim 1, wherein the kaolin suspension of step a) is in alcohol.

5. The process for preparing ceramic materials, according to claim 1, wherein the calcining step b) is carried out at a temperature between 400° C. and 900° C. for a period between 1 and 240 hours.

6. The process for preparing ceramic materials, according to claim 1, wherein the calcining step b) is carried out at a temperature of 900° C. for a period of 2 hours.

7. The process for preparing ceramic materials, according to claim 1, wherein the calcining step b) is carried out after sieving the powder obtained in step a).

8. The process for preparing ceramic materials, according to claim 1, wherein the milling step c) is carried out by attrition in a high-energy mill.

9. The process for preparing ceramic materials, according to claim 8, wherein the attrition in the high-energy mill is carried out operating at 100-400 r.p.m. for periods of more than 20 minutes.

10. The process for preparing ceramic materials, according to claim 1, wherein the drying step c) is carried out by means of atomisation.

11. The process for preparing ceramic materials, according to claim 1, wherein the shaping step d) is carried out by isostatic pressing.

12. The process for preparing ceramic materials, according to claim 11, wherein the shaping step is carried out by means of cold isostatic pressing and at pressures between 100 and 400 MPa.

13. The process for preparing ceramic materials, according to claim 1, wherein the sintering step e) is carried out at a temperature between 900° C. and 1,500° c.

14. The process for preparing ceramic materials, according to claim 13, wherein the sintering step e) is carried out at a temperature of 1,350° C.

15. The process for preparing ceramic materials, according to claim 13, wherein a temperature ramp of 2-10° C./min is used, maintaining the final temperature for a period between 1 and 4 hours, and subsequent cooling of up to 900° C. using a temperature ramp of 2-10° C./min.

16. The process for preparing ceramic materials, according to claim 1, wherein steps d) and e) are carried out using the hot-press technique.

17. The process for preparing ceramic materials, according to claim 16, wherein the hot-pressing process is carried out at a temperature within the range of 900° C.-1,400° C.

18. The process for preparing ceramic materials, according to claim 16, wherein the hot-pressing process is carried out at a pressure between 5 and 80 MPa.

19. The process for preparing ceramic materials, according to claim 1, wherein steps d) and e) are carried out using the spark plasma sintering (SPS) technique.

20. The process for preparing ceramic materials, according to claim 19, wherein steps d) and e) are carried out at a temperature between 900° C. and 1,250° C.

21. The process for preparing ceramic materials, according to claim 19, wherein the duration of the sintering process is greater than 1 minute.

22. The process for preparing ceramic materials, according to claim 19, wherein steps d) and e) are carried out at a pressure between 5 and 80 MPa.

\* \* \* \* \*